(12) United States Patent
Shiba

(10) Patent No.: US 9,035,820 B2
(45) Date of Patent: May 19, 2015

(54) MEASUREMENT DEVICE, MEASUREMENT SYSTEM, MEASUREMENT METHOD, AND PROGRAM

(75) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 790 days.

(21) Appl. No.: 13/256,708

(22) PCT Filed: Mar. 30, 2010

(86) PCT No.: PCT/JP2010/055649
§ 371 (c)(1),
(2), (4) Date: Nov. 11, 2011

(87) PCT Pub. No.: WO2010/113926
PCT Pub. Date: Oct. 7, 2010

(65) Prior Publication Data
US 2012/0056886 A1    Mar. 8, 2012

(30) Foreign Application Priority Data

Mar. 31, 2009   (JP) ................................. 2009-085932

(51) Int. Cl.
*G01S 13/44* (2006.01)
*G01S 7/285* (2006.01)
(Continued)

(52) U.S. Cl.
CPC .............. *G01S 13/4418* (2013.01); *G01S 13/42* (2013.01); *G01S 13/44* (2013.01); *G01S 13/4409* (2013.01); *G01S 7/285* (2013.01); *G01S 7/4021* (2013.01);
(Continued)

(58) Field of Classification Search
CPC ........... G01S 7/41; G01S 13/00; G01S 13/02; G01S 13/06; G01S 13/42; G01S 13/44–13/449
USPC .......................... 342/107, 113, 147–158, 175
See application file for complete search history.

(56) References Cited

U.S. PATENT DOCUMENTS 4,028,697 A * 6/1977 Albanese et al. ............. 342/159
4,413,332 A * 11/1983 Gilmour ....................... 367/123
(Continued)

FOREIGN PATENT DOCUMENTS

GB        2204431 A      11/1988
JP      59-195170 A      11/1984
(Continued)

OTHER PUBLICATIONS

European search report for EP10758697.6 dated Aug. 3, 2012.
(Continued)

*Primary Examiner* — Peter Bythrow
(74) *Attorney, Agent, or Firm* — Sughrue Mion, PLLC

(57) ABSTRACT

Provided is a technique capable of suppressing the deterioration in azimuth resolution and distance resolution in even a modulated and transmitted or received signal or a signal reflected by an object and varied in intensity when acquiring waveform information. A measurement device comprise: a plurality of sensors which receive waves propagating through a space; and a sampling timing calculation means which obtains, on the basis of the relative positions of the sensors and the velocities of the waves, the difference between the arrival times of the waves received by the respective sensors and calculates, for each sensor, sampling timing for acquiring the waveform information relating to the waves, on the basis of the difference between the arrival times.

20 Claims, 6 Drawing Sheets

(51) Int. Cl.
*G01S 7/40* (2006.01)
*G01S 7/52* (2006.01)
*G01S 7/526* (2006.01)
*G01S 15/42* (2006.01)
*G01S 13/42* (2006.01)

(52) U.S. Cl.
CPC ............ *G01S 7/52004* (2013.01); *G01S 7/526* (2013.01); *G01S 15/42* (2013.01)

(56) References Cited

U.S. PATENT DOCUMENTS

| | | | |
|---|---|---|---|
| 4,549,184 A * | 10/1985 | Boles et al. | 342/25 B |
| 4,559,606 A * | 12/1985 | Jezo et al. | 708/425 |
| 4,559,607 A * | 12/1985 | Lu | 708/422 |
| 5,020,015 A * | 5/1991 | Jones et al. | 708/422 |
| 5,544,655 A * | 8/1996 | Daigle | 600/447 |
| 5,585,803 A * | 12/1996 | Miura et al. | 342/372 |
| RE36,819 E * | 8/2000 | Gellner et al. | 342/70 |
| 6,292,135 B1 * | 9/2001 | Takatori et al. | 342/383 |
| 6,822,606 B2 * | 11/2004 | Ponsford et al. | 342/192 |
| 6,864,826 B1 * | 3/2005 | Stove | 342/22 |
| 7,151,482 B2 * | 12/2006 | Natsume et al. | 342/147 |
| 7,196,656 B2 * | 3/2007 | Shirakawa | 342/147 |
| 7,388,655 B2 * | 6/2008 | Mori | 356/5.1 |
| 7,515,663 B2 * | 4/2009 | Barton et al. | 375/354 |
| 7,579,988 B2 * | 8/2009 | Xu et al. | 342/417 |
| 7,619,558 B2 * | 11/2009 | Griessbaum | 342/124 |
| 7,664,303 B2 * | 2/2010 | Zwirn et al. | 382/131 |
| 7,952,513 B2 * | 5/2011 | Tietjen et al. | 342/52 |
| 2002/0149396 A1 * | 10/2002 | Mizuhara et al. | 327/1 |
| 2003/0052813 A1 * | 3/2003 | Natsume | 342/70 |
| 2003/0095063 A1 * | 5/2003 | Fullerton | 342/118 |
| 2004/0119633 A1 * | 6/2004 | Oswald et al. | 342/70 |
| 2005/0134497 A1 * | 6/2005 | Mafune et al. | 342/27 |
| 2006/0066474 A1 * | 3/2006 | Shirakawa | 342/147 |
| 2006/0262007 A1 * | 11/2006 | Bonthron et al. | 342/70 |
| 2008/0100510 A1 * | 5/2008 | Bonthron et al. | 342/373 |
| 2008/0122681 A1 * | 5/2008 | Shirakawa | 342/147 |
| 2008/0228062 A1 * | 9/2008 | Zwirn et al. | 600/407 |

FOREIGN PATENT DOCUMENTS

| | | |
|---|---|---|
| JP | 63-187182 A | 8/1988 |
| WO | 2005114593 A1 | 12/2005 |

OTHER PUBLICATIONS

Kim J H et al: "Pipelined sampled-delay focusing in ultrasound imaging systems", Ultrasonic Imaging, Dynamedia Inc., Silver Spring, MD, US, vol. 9, No. 2, Apr. 1, 1987, pp. 75-91.

International Search Report for PCT/JP2010/055649 mailed Jul. 6, 2010.

N. Kikuma, "Adaptive Antenna Technology", Ohmsha Ltd., Oct. 10, 2003, pp. 122-166.

Marine Acoustics Society of Japan, "Basics and Application of Marine Acoustics", Seizando-Shoten Publishing Co., Ltd., 2004, pp. 64-65, 163.

* cited by examiner

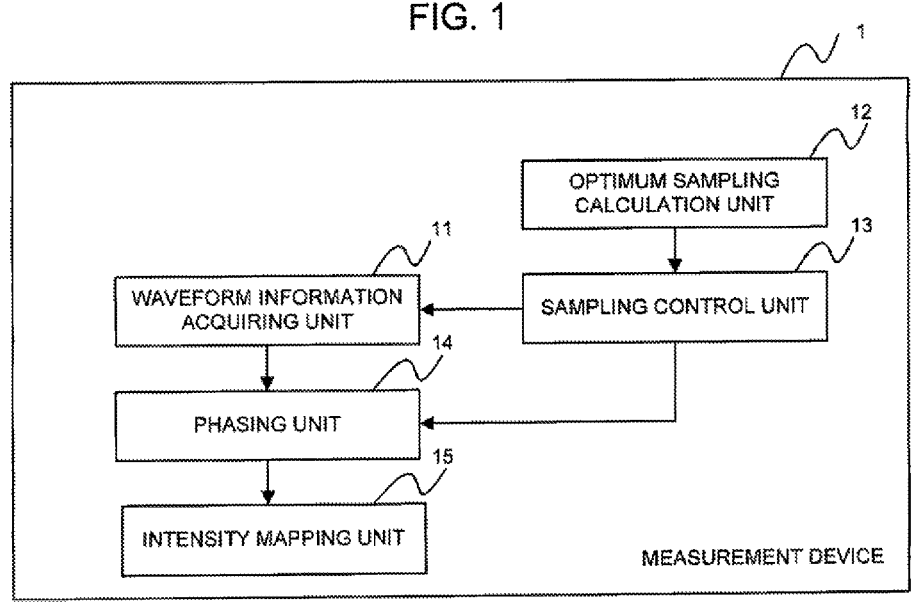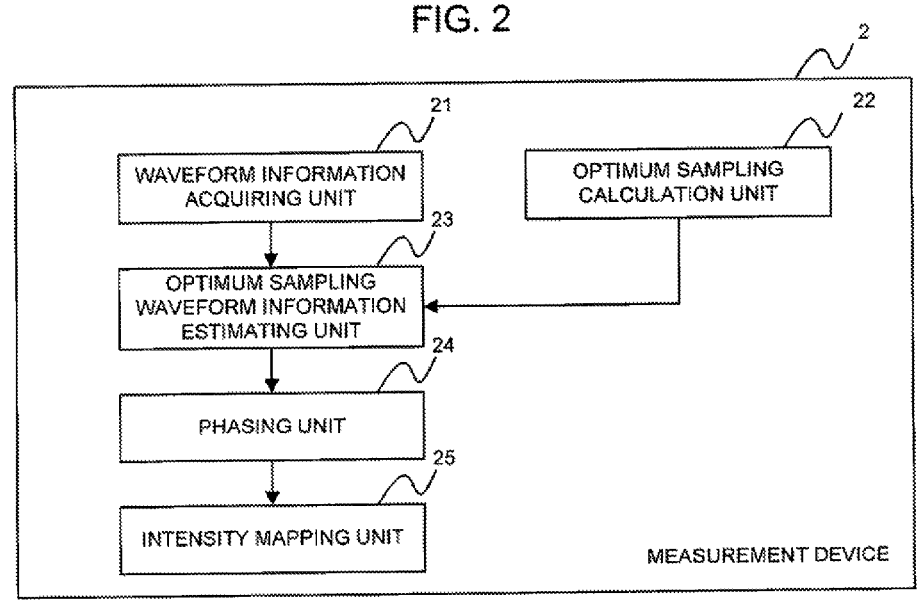

MEASUREMENT DEVICE, MEASUREMENT SYSTEM, MEASUREMENT METHOD, AND PROGRAM

TECHNICAL FIELD

The present invention relates to a measurement device, a measurement system, a measurement method and a program for calculating sampling timing to be used for acquiring waveform information on waves such as radio waves, sound waves and light waves.

BACKGROUND ART

A lot of methods have been proposed for acquiring waveform information on radio waves, sound waves, etc. using a sensor such as a radar, sonar or lidar and determining spatial distribution of wave source intensity.

There exist a variety of methods, such as the beam former method, as described in Non Patent Literature 1, for example. In a technique described in the Non Patent Literature 1, distribution in each direction at a point in time is acquired along a time series and arrival time of each wave is converted into distance from the sensor based on the velocity of the wave, by which spatial distribution (direction vs. distance) can be acquired. Further, by arranging the spatial distributions in order of the time series, temporal distribution can be acquired.

In order to achieve high directivity, many of the aforementioned methods adjust the phase of each piece of waveform information acquired from each sensor element of the sensor in consideration of the shapes and relative positions of the sensor elements.

Meanwhile, such waveform information, which was generally processed as an analog signal continuous on the time axis, recently tends to be sampled discretely on the time axis and processed as a digital signal. The processing of the waveform information as a digital signal made it possible to employ a variety of complicated algorithms with ease. The method described in the Non Patent Literature 1 was also designed taking the digitization into consideration.

CITATION LIST

Non Patent Literature

[Non Patent Literature 1] Nobuyoshi Kikuma; "Adaptive Antenna Technology", pages 122-166, Ohmsha, Ltd. (Oct. 10, 2003)

SUMMARY OF INVENTION

Technical Problem

In the case where the waveform information is processed as a digital signal, the waveform information is sampled only discretely, that is, the acquired waveform information has not been sampled at desired phases in most cases. Therefore, in the phase adjustment to the digital signal, the phase is adjusted by Fourier transforming the waveform information regarding a certain time period, including the time of the sampling timing that has been set for a reference sensor element, for example, and multiplying the acquired Fourier transform by a phase in complex representation.

For example, assuming that the waveform information acquired from a sensor element N from a time point $t_0$ to a time point $t_1$ is $f_N$ and the phase is shifted by $\theta$, the phase-adjusted Fourier transform to be obtained is $F_N e^{i\theta}$ (where $F_N$ represents the Fourier transform of $f_N$ and $i^2 = -1$). This corresponds to extrapolating waveform information at a desired phase from the waveform information at the sampling times.

However, this extrapolation technique implicitly assumes that the frequency distribution has no time fluctuation. Thus, the precision of the extrapolation deteriorates for signals transmitted and received through modulation and signals whose intensity has changed due to reflection by objects. As a result, the azimuth resolution and the distance resolution can deteriorate in some cases.

It is therefore the primary object of the present invention to provide a technology capable of reducing the deterioration in the azimuth resolution and the distance resolution in the acquisition of the waveform information even for signals transmitted and received through modulation and signals whose intensity has changed due to reflection by objects.

Solution to Problem

In order to resolve the above problem, a measurement device in accordance with the present invention comprises: a plurality of sensors for receiving a wave propagating through space; and sampling timing calculation means for determining difference in arrival time of the wave received by each sensor based on the relative position of each sensor and velocity of the wave and calculating sampling timing for each sensor for acquiring waveform information on the wave based on the arrival time difference.

In order to resolve the above problem, a measurement system in accordance with the present invention comprises: a plurality of sensors for receiving a wave propagating through space; and sampling timing calculation means for determining difference in arrival time of the wave received by each sensor based on the relative position of each sensor and velocity of the wave and calculating sampling timing for each sensor for acquiring waveform information on the wave based on the arrival time difference.

In order to resolve the above problem, a measurement method in accordance with the present invention comprises: a reception step of receiving a wave propagating through space with sensors; and a sampling timing calculation step of determining difference in arrival time of the wave received by each sensor based on the relative position of each sensor and velocity of the wave and calculating sampling timing for each sensor for acquiring waveform information on the wave based on the arrival time difference.

In order to resolve the above problem, a program for an information processing device in accordance with the present invention causes the information processing device to execute a sampling timing calculation process of determining difference in arrival time of a wave received by each sensor, provided for receiving the wave propagating through space, based on the relative position of each sensor and velocity of the wave and calculating sampling timing for each sensor for acquiring waveform information on the wave based on the arrival time difference.

Advantageous Effects of Invention

By the present invention, the deterioration in the azimuth resolution and the distance resolution can be reduced in devices for acquiring waveform information such as radars, sonars and lidars even for signals transmitted and received through modulation and signals whose intensity has changed due to reflection by objects. This effect is achieved since precise frequency distribution can be acquired by sampling the waveform information with sampling timing determined considering the phase.

BRIEF DESCRIPTION OF DRAWINGS

FIG. 1 is a block diagram showing the configuration of a first exemplary embodiment of the present invention.

FIG. 2 is a block diagram showing the configuration of a second exemplary embodiment of the present invention.

DESCRIPTION OF EMBODIMENTS

Figure 3:
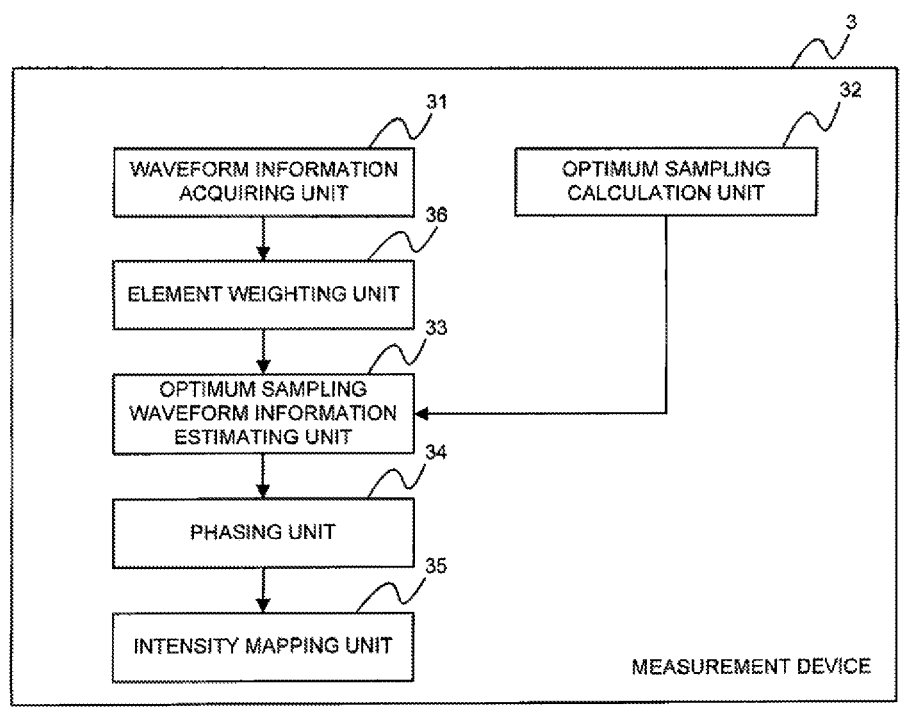
FIG. 3 is a block diagram showing the overall configuration of a third exemplary embodiment of the present invention.

In the present invention, waveform information on a wave propagating through space, such as a radio wave, sound wave or light wave, is acquired and sampling timing for sampling the waveform information acquired is calculated for each sensor for acquiring the waveform information based on relative positions of the sensors. This makes it possible to reduce the deterioration in the azimuth resolution and the distance resolution even for signals transmitted and received through modulation and signals whose intensity has changed due to reflection by objects. Incidentally, the space means real space in the air, water, etc. The details of the present invention will be described below.

First Exemplary Embodiment

FIG. 1 is a block diagram of a measurement system (measurement device) in accordance with a first exemplary embodiment of the present invention. The measurement device comprises a waveform information acquiring unit 11, an optimum sampling calculation unit 12, a sampling control unit 13, a phasing unit 14 and an intensity mapping unit 15.

The waveform information acquiring unit 11 is implemented by a radar, sonar, lidar or the like including one or more sensor elements for receiving waves propagating through space, such as radio waves, sound waves or light waves, and a sampling unit for sampling the waves received by the sensor elements. The waveform information acquiring unit 11, designed to allow for modification of the sampling timing, acquires the waveform information by sampling the wave received by each sensor element with the sampling timing which has been set by the sampling control unit 13 (explained later) and thereby outputs the frequency distribution. While a plurality of sensor elements included in a sensor are generally arranged in a line at half-wavelength intervals, the arrangement of the sensor elements in the present invention is not particularly restricted. For example, the sensor elements may be arranged on a ring, on a spherical surface, on a space lattice like a crystal lattice, etc. While sensor elements having identical sensitivity characteristics and wavelength characteristics are arranged in many cases, the sensitivity characteristics and wavelength characteristics of the sensor elements arranged may also be nonuniform.

The optimum sampling calculation unit 12 calculates sampling timing optimum for each direction and each distance depending on previously specified azimuth resolution and distance resolution, based on the positional relationship among the sensor elements. Positional information representing the positions of the sensor elements has previously been stored in the measurement device since the positions of the sensor elements had already been found during the setting of the device.

Here, the details of the optimum sampling calculation unit 12 will be explained. One of the sensor elements is designated as a reference sensor element. A wave source is assumed to exist at a certain position in a certain direction, for example. The difference in the arrival time of an iso-phase wave at each sensor element is calculated based on the wave velocity and a relative position (distance difference) representing how closer to or farther from the wave source each sensor element is in comparison with the reference sensor element. From the calculated arrival time difference, the optimum sampling timing for each sensor element is determined. Therefore, the optimum sampling timing calculated by the optimum sampling calculation unit 12 is timing that enables acquisition of waveform information in which the phase of the wave received by the reference sensor element is identical with that of the wave received by each sensor element other than the reference sensor element. The azimuth resolution in the calculation of the sampling timing is not necessarily required to be uniform in all directions. For example, the azimuth resolution may be set fine for the front and coarse for other directions. Similarly, the distance resolution is not required to be uniform either. For example, the distance resolution may be set fine for short distances and coarse for long distances. Incidentally, the wave source means an object that emits or reflects waves such as radio waves, sound waves and light waves.

The sampling control unit 13 controls the waveform information acquiring unit 11 so that the waveform information on the received wave is acquired with the optimum sampling timing. Further, the sampling control unit 13 controls the phasing unit 14 so that the multiple pieces of waveform information on the waves received by the sensor elements are added together coherently, in consideration of the difference in the arrival time of the iso-phase wave between the reference sensor element and each of the other sensor elements.

Under the control of the sampling control unit 13, the phasing unit 14 coherently adds up the multiple pieces of waveform information on the waves received by the sensor elements based on information on the difference in the arrival time of the iso-phase wave between the reference sensor element and each of the other sensor elements supplied from the sampling control unit 13. The waveform information is acquired at least for each direction or for each distance, with the optimum sampling timing for each element calculated by the optimum sampling calculation unit 12. Then, the intensity in each direction or at each distance is determined by adding up the multiple pieces of waveform information acquired from all the sensor elements. The waveform information may be added up either in the real space or in the frequency space. When added up in the real space, the intensity in the frequency band used for transmission and reception is determined by converting the sum of the waveform information into a representation in the frequency space by the Fourier transform or the like. Alternatively, the intensity in the frequency band used for transmission and reception may also be determined by removing frequency bands other than the frequency band used for transmission and reception in the real space by use of a bandpass filter, etc. and converting the result of the removal into a representation in the frequency space by the Fourier transform or the like. Also when the multiple pieces of waveform information are added up in the frequency space, the intensity in the frequency band used for transmission and reception is determined. By determining the intensity at each sampling timing (at each sampling time), the intensity in each direction and at each distance can be determined.

The intensity mapping unit 15 stores the intensity in each direction and at each distance determined by the phasing unit 14 in a memory in order of the time series. Further, the intensity mapping unit 15 displays the frequency distribution on a display monitor in two-dimensional or three-dimensional representation using axes representing the direction and the distance, for example. The two-dimensional displaying can be performed by, for example, using a polar coordinate system with coordinate axes representing the distance and the direction measured in a horizontal or vertical plane and placing the waveform information acquiring unit 11 at the origin of the coordinate system, like the so-called "B scope". It is possible to facilitate the visual discrimination by expressing the intensity by gray scale or by pseudo colors. The three-dimensional displaying can also be performed by using a polar coordinate system, for example. In cases where the display monitor is capable of displaying two-dimensional images only, it is desirable that the user's visual point can be changed freely since three-dimensional images have to be projected onto a two-dimensional plane. Time fluctuation can be understood with ease if the displaying is made as a motion picture, for example.

The optimum sampling calculation unit 12, the sampling control unit 13 and the intensity mapping unit 15 can be implemented by various types of devices capable of digital signal processing. For example, the units can be implemented by a board computer made up of a DSP (Digital Signal Processor), a high-capacity auxiliary storage device, a high-capacity memory, etc., a general-purpose personal computer, or a workstation. The intensity mapping unit 15 may be further equipped with a display monitor for letting the user view the spatial distribution and temporal distribution of the intensity.

Next, the operation of this exemplary embodiment will be explained below with reference to FIG. 1.

First, a wave such as a radio wave, sound wave or light wave is received and held by the waveform information acquiring unit 11.

The optimum sampling calculation unit 12 calculates the sampling timing necessary for each direction and each distance based on the wave velocity and the positional relationship among the sensor elements according to the preset azimuth resolution and distance resolution, and controls the waveform information acquiring unit 11 to make the unit 11 acquire the waveform information on the received wave with the calculated optimum sampling timing. Meanwhile, the sampling control unit 13 informs the phasing unit 14 of the difference in the arrival time of the iso-phase wave between the reference sensor element and each of the other sensor elements.

The phasing unit 14 extracts the waveform information, which has been acquired with the optimum sampling timing for each element of the waveform information acquiring unit 11 determined by the optimum sampling calculation unit 12, for each direction and each distance and determines the intensity by coherently adding up the extracted pieces of waveform information in regard to all the sensor elements under the control of the sampling control unit 13.

The intensity mapping unit 15 successively stores data of the intensity in each direction and at each distance determined by the phasing unit 14 in a memory in each time series. Further, the intensity mapping unit 15 displays the intensity on the display monitor in two-dimensional or three-dimensional representation with axes representing the direction and the distance, for example.

Incidentally, while the optimum sampling timing is calculated in the above exemplary embodiment based on the wave velocity and the relative position of each sensor element from the wave source, the calculation of the optimum sampling timing may also be executed by further using at least one selected from physical information on each sensor element (shape, size, etc.), wavelength components of the wave, and frequency components of the wave. While the multiple pieces of waveform information on the waves received by the sensor elements are added up coherently (that is, the phase of each piece of waveform information is adjusted) based on the difference in the arrival time of the iso-phase wave in the above explanation, the coherence adjustment may also be made based on a phase difference calculated from the difference in the arrival time.

By the exemplary embodiment described above, the deterioration in the azimuth resolution and the distance resolution can be reduced even for signals transmitted and received through modulation and signals whose intensity has changed due to reflection by objects. This effect is achieved by the above exemplary embodiment since the optimum sampling timing in consideration of the phase is previously calculated for each sensor element based on the difference in the wave arrival time according to desired azimuth resolution and distance resolution and the sampling timing of the waveform information acquiring unit is controlled so that the waveform information can be acquired with the calculated sampling timing.

Second Exemplary Embodiment

Next, a second exemplary embodiment in accordance with the present invention will be described in detail with reference to figures. In the second exemplary embodiment, a waveform information acquiring unit 21 has a configuration incapable of changing the sampling timing.

Referring to FIG. 2, while the second exemplary embodiment of the present invention has a configuration similar to that of the first exemplary embodiment, the second exemplary embodiment includes no sampling control unit. Instead, an optimum sampling waveform information estimating unit 23 is placed between a waveform information acquiring unit 21 and a phasing unit 24. Further, the optimum sampling calculation unit is connected with the optimum sampling waveform information estimating unit 23 only. The operations of the waveform information acquiring unit 21, optimum sampling calculation unit 22, phasing unit 24 and intensity mapping unit 25 are equivalent to those of corresponding components in the first exemplary embodiment. Detailed explanation is omitted for the components equivalent to those in the first exemplary embodiment.

The waveform information acquiring unit 21 executes the sampling with prescribed sampling timing.

The optimum sampling waveform information estimating unit 23 estimates waveform information that is acquirable by executing the sampling with the optimum sampling timing calculated by the optimum sampling calculation unit 22, by use of waveform information acquired by executing the sampling with sampling timing approximate to the optimum sampling timing.

Here, the details of the optimum sampling waveform information estimating unit 23 will be described.

Since the waveform information acquiring unit 21 is incapable of changing its sampling timing, sampling timing (sampling time) within a time range including the time of the optimum sampling timing (i.e., optimum sampling time) determined by the optimum sampling calculation unit 22 is set. The time range is previously specified by the user. There may be cases where the time range is set by placing the optimum sampling timing (optimum sampling time) at the center of the time range or at the rear end of the time range in time. Placing the optimum sampling timing at the rear end of the time range in time corresponds to estimating waveform information at optimum sampling timing (optimum sampling time) in the future from the waveform information of the past.

Subsequently, in the time range which has been set as above, a plurality of sampling timings (i.e., sampling times) that can be actually set to the waveform information acquiring unit 21 are determined. These sampling timings (sampling times) will hereinafter be referred to as "semi-optimum sampling timings". Thereafter, the frequency distribution as the waveform information on the wave received by each sensor element is determined at each semi-optimum sampling timing by executing the Fourier transform or the like.

Subsequently, frequency distribution at the optimum sampling timing (i.e., at the optimum sampling time) is estimated from the frequency distribution at the semi-optimum sampling timing according to a frequency distribution fluctuation model previously determined by the user.

The estimation is performed by model fitting, by use of a previously determined frequency distribution fluctuation model. For example, in cases where waveform information modulated by amplitude modulation, frequency modulation or phase modulation is transmitted and received, the fluctuation in the frequency distribution can be estimated easily from the modulation. In the case of linear frequency modulation, the fluctuation in the frequency distribution can be expressed by a linear function regarding the time. Even when the intensity changes due to reflection by objects, the estimation is possible by simulating the reflection based on physical laws of radio waves, sound waves, etc. As the method of the simulation, the FDTD (Finite-Difference Time-Domain) method, developing a wave equation using difference equations, can be used, for example. Simpler methods such as the PE (Parabolic Equation) method, the normal mode method or the ray theory, may also be employed. It is also possible to more simply consider that each reflecting surface causes amplitude modulation like a single-peaked function to the incident wave. Even when modulations due to reflection by objects are not taken into consideration, the waveform information at the optimum sampling timing can be estimated with higher precision in comparison with conventional techniques, just by following the modulation originally intended for the transmission and reception.

Next, the operation of the second exemplary embodiment will be described below.

The optimum sampling timing is calculated by the same process as in the first exemplary embodiment.

The optimum sampling waveform information estimating unit 23 sets sampling timings (sampling times) within a time range including the optimum sampling timing (optimum sampling time), as specified by the user. Further, in the time range which has been set, the optimum sampling waveform information estimating unit 23 determines a plurality of semi-optimum sampling timings that can be actually set to the waveform information acquiring unit 21.

The optimum sampling waveform information estimating unit 23 makes settings of the waveform information acquiring unit 21 so that the unit 21 carries out the sampling with the determined semi-optimum sampling timings. The waveform information acquiring unit 21 determines the frequency distribution, as the waveform information on the wave received by each sensor element, with the semi-optimum sampling timing which has been set. Subsequently, the optimum sampling waveform information estimating unit 23 estimates the frequency distribution at the optimum sampling timing from the frequency distribution at the semi-optimum sampling timing according to the frequency distribution fluctuation model previously determined by the user.

The phasing unit 24 determines the intensity by extracting the waveform information, which has been estimated by the optimum sampling waveform information estimating unit 23, for each direction and each distance and adding up the extracted pieces of waveform information in regard to all the sensor elements.

The intensity mapping unit 25 successively stores data of the intensity in each direction and at each distance determined by the phasing unit 24 in a memory in each time series. Further, the intensity mapping unit 25 displays the intensity on a display monitor in two-dimensional or three-dimensional representation with axes representing the direction and the distance, for example.

By this exemplary embodiment, even when a waveform information acquiring unit incapable of freely changing the sampling timing is used, the waveform information at the optimum sampling timing can be estimated with high precision based on waveform information at sampling timing in the vicinity of the optimum sampling timing.

Third Exemplary Embodiment

Next, a third exemplary embodiment in accordance with the present invention will be described in detail with reference to FIG. 3. Incidentally, while this exemplary embodiment will be explained on the basis of the second exemplary embodiment described above, this exemplary embodiment may also be applied to the first exemplary embodiment.

In this exemplary embodiment, an element weighting unit 36 is placed after the waveform information acquiring unit 21 in the above second exemplary embodiment.

In the third exemplary embodiment, a waveform information acquiring unit 31, an optimum sampling calculation unit 32, an optimum sampling waveform information estimating unit 33, a phasing unit 34 and an intensity mapping unit 35 operate in the same way as corresponding components in the second exemplary embodiment of the present invention, and thus detailed explanation thereof is omitted.

The element weighting unit 36 improves the azimuth resolution by properly weighting each piece of waveform information acquired from each of the sensor elements constituting the waveform information acquiring unit 31. While the weighting (i.e., weights for the sensor elements) may be set properly according to various methods, a technique described in Non Patent Literature 2 (Non Patent Literature 2: Marine Acoustics Society of Japan; "Basics and Application of Marine Acoustics", pages 64, 65 and 163, Seizando-Shoten Publishing Co., Ltd. (Apr. 28, 2004)) may be used, for example. The weighting technique described in the Non Patent Literature 2 is a technique generally called "shading". The weighting in this exemplary embodiment is carried out by multiplying the output of each sensor element by a Hanning function, Chebyshev polynomial or the like as described in the Non Patent Literature 2.

Next, the operation of the third exemplary embodiment will be described below.

In this exemplary embodiment, the waveform information sampled with the semi-optimum sampling timing is acquired by the same process as in the above second exemplary embodiment.

The element weighting unit 36 weights each piece of waveform information.

The optimum sampling waveform information estimating unit 33 estimates the frequency distribution at the optimum sampling timing from frequency distribution of each of the weighted pieces of waveform information.

The phasing unit 34 determines the intensity by extracting the waveform information, which has been estimated by the optimum sampling waveform information estimating unit 33, for each direction and each distance and adding up the extracted pieces of waveform information in regard to all the sensor elements.

The intensity mapping unit 35 successively stores data of the intensity in each direction and at each distance determined by the phasing unit 34 in a memory in each time series. Further, the intensity mapping unit 35 displays the intensity on a display monitor in two-dimensional or three-dimensional representation with axes representing the direction and the distance, for example.

By this exemplary embodiment, similarly to the second exemplary embodiment, the waveform information at the optimum sampling timing can be estimated with high precision based on waveform information at sampling timing in the vicinity of the optimum sampling timing even when a waveform information acquiring unit incapable of freely changing the sampling timing is employed.

Fourth Exemplary Embodiment

Figure 4:
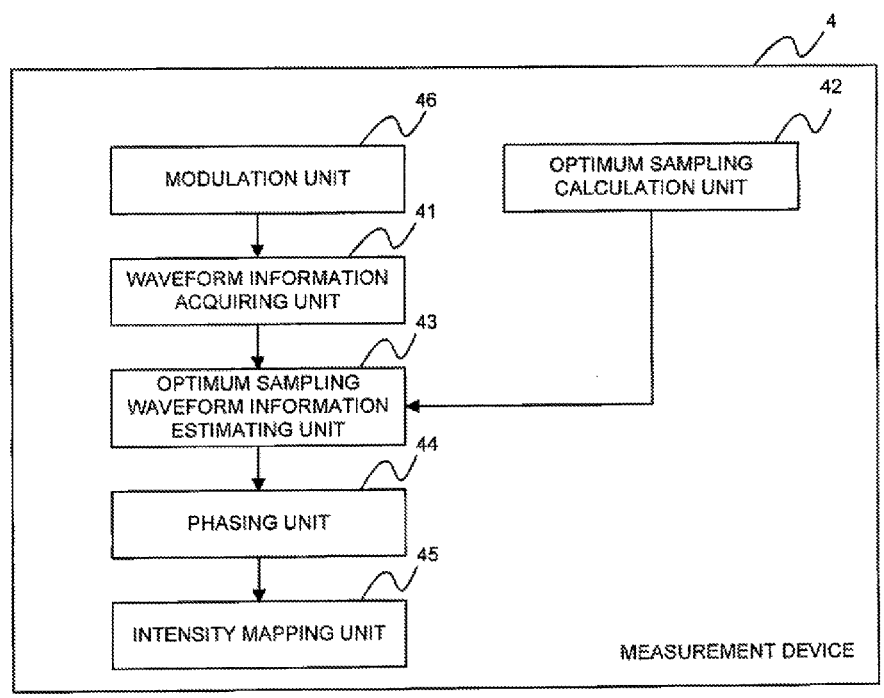
FIG. 4 is a block diagram showing the overall configuration of a fourth exemplary embodiment of the present invention.

Next, a fourth exemplary embodiment in accordance with the present invention will be described in detail with reference to FIG. 4. While this exemplary embodiment will be explained on the basis of the second exemplary embodiment, this exemplary embodiment may also be applied to the first or third exemplary embodiment.

In this exemplary embodiment, a modulation unit 46 is placed before the waveform information acquiring unit 21 in the second exemplary embodiment. Specifically, the modulation unit 46 is placed after the sensor elements and before the sampling unit for sampling the waves received by the sensor elements.

In the fourth exemplary embodiment, a waveform information acquiring unit 41, an optimum sampling calculation unit 42, an optimum sampling waveform information estimating unit 43, a phasing unit 44 and an intensity mapping unit 45 operate in the same way as corresponding components in the second exemplary embodiment of the present invention, and thus detailed explanation thereof is omitted.

The modulation unit 46 modulates the wave received by each sensor element by applying a sinusoidal wave at a particular frequency or a specifically modulated sinusoidal wave to the received wave and changes the frequency distribution by applying a bandlimiting filter to the modulated wave.

Here, the modulation unit 46 will be explained in detail. The modulation unit 46 applies a sinusoidal wave to the received wave and then applies a lowpass filter to the modulated wave, for example. This lowers the frequency of the received wave and makes it possible to reduce the sampling rate of the waveform information acquiring unit 41. Since time-variation of the amplitude of the waveform information decreases with the decrease in the frequency, the estimation of the waveform information at the optimum sampling timing is facilitated.

Next, the operation of the fourth exemplary embodiment will be described below.

The modulation unit 46 modulates the wave received by each sensor element and applies a bandlimiting filter to the modulated wave.

The waveform information acquiring unit 41 acquires each piece of waveform information by sampling the modulated wave.

Subsequent processes are equivalent to those in the above exemplary embodiments, and thus detailed explanation thereof is omitted.

By this exemplary embodiment, the estimation of the waveform information at the optimum sampling timing is facilitated through the reduction of the time-variation of the amplitude of the waveform information.

Fifth Exemplary Embodiment

Figure 5:
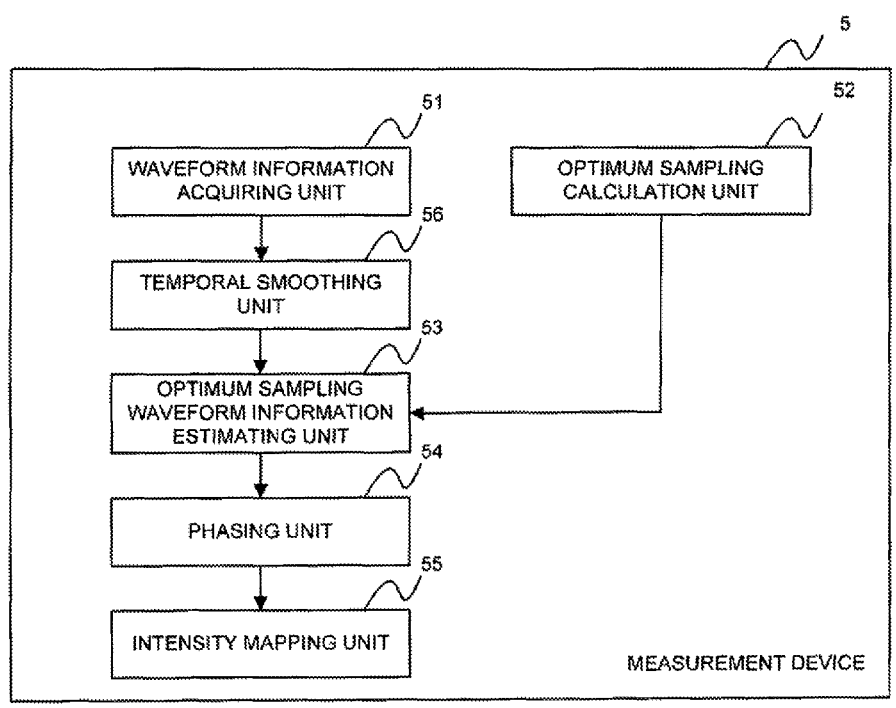
FIG. 5 is a block diagram showing the overall configuration of a fifth exemplary embodiment of the present invention.

Next, a fifth exemplary embodiment in accordance with the present invention will be described in detail with reference to FIG. 5. While this exemplary embodiment will be explained on the basis of the second exemplary embodiment, this exemplary embodiment may also be applied to the first, third or fourth exemplary embodiment.

In this exemplary embodiment, a temporal smoothing unit 56 is placed immediately after the waveform information acquiring unit in the second exemplary embodiment.

In the fifth exemplary embodiment, a waveform information acquiring unit 51, an optimum sampling calculation unit 52, an optimum sampling waveform information estimating unit 53, a phasing unit 54 and an intensity mapping unit 55 operate in the same way as corresponding components in the second exemplary embodiment of the present invention, and thus detailed explanation thereof is omitted.

The temporal smoothing unit 56 makes comparison with fluctuations of the waveform information before and after the sampling timing in regard to each sampling timing. If the value of intensity changes sharply, the temporal smoothing unit 56 judges that the effect of noise is strong and estimates a more appropriate intensity value at the sampling timing from the fluctuations of the waveform information before and after the sampling timing. The estimation can be performed by, for example, fitting a sinusoidal wave to the acquired waveform information in a preset time range by the least-squares method and replacing the value of the waveform information at each sampling timing (each sampling time) with the fitted value. It is also possible to make the replacement with the fitted value only when deviation from the sinusoidal wave is a preset threshold value or more. The judgment on whether the change is sharp or not is made by setting a threshold value and checking whether the change is within a permissible range or not.

Next, the operation of the fifth exemplary embodiment will be described below.

The waveform information acquiring unit 51 acquires the waveform information by the same process as in the above exemplary embodiments.

The temporal smoothing unit 56 makes comparison with fluctuations of the waveform information before and after the sampling timing in regard to each sampling timing. If the value changes sharply, the temporal smoothing unit 56 judges that the effect of noise is strong, estimates a more appropriate intensity value at the sampling timing from the fluctuations of the waveform information before and after the sampling timing, and corrects the waveform information.

Subsequent processes are equivalent to those in the above exemplary embodiments, and thus detailed explanation thereof is omitted.

By this exemplary embodiment, the effect of noise can be taken into consideration, by which the deterioration in the azimuth resolution and the distance resolution can be reduced.

Sixth Exemplary Embodiment

Figure 6:
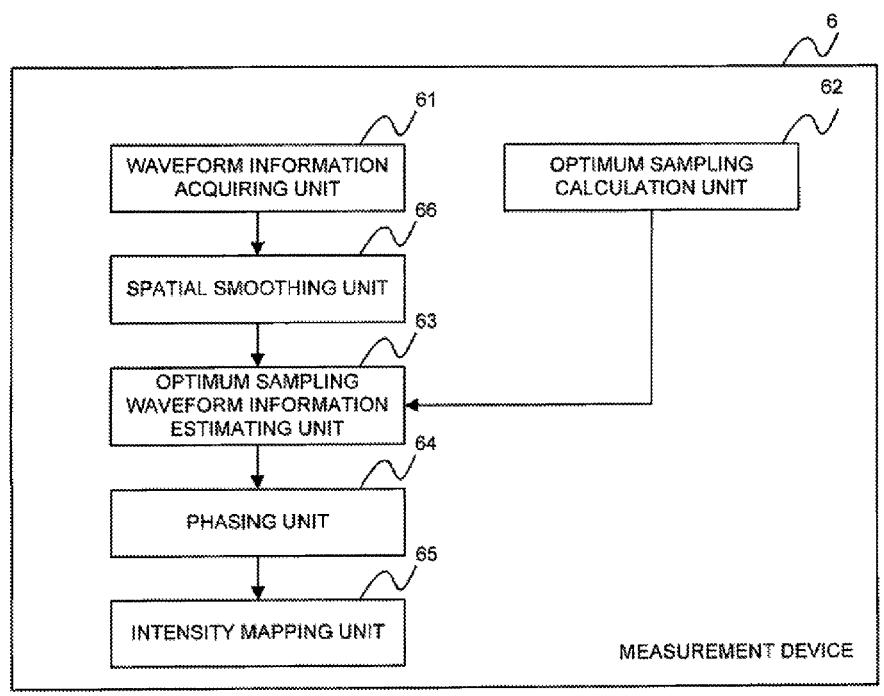
FIG. 6 is a block diagram showing the overall configuration of a sixth exemplary embodiment of the present invention.

Next, a sixth exemplary embodiment in accordance with the present invention will be described in detail with reference to FIG. 6. While this exemplary embodiment will be explained on the basis of the second exemplary embodiment, this exemplary embodiment may also be applied to the first, third, fourth or fifth exemplary embodiment.

In this exemplary embodiment, a case where a spatial smoothing unit 66 is placed immediately after the waveform information acquiring unit in the second exemplary embodiment will be explained.

In the sixth exemplary embodiment of the present invention, a waveform information acquiring unit 61, an optimum sampling calculation unit 62, an optimum sampling waveform information estimating unit 63, a phasing unit 64 and an intensity mapping unit 65 operate in the same way as corresponding components in the second exemplary embodiment of the present invention, and thus detailed explanation thereof is omitted.

The spatial smoothing unit 66 compares the waveform information acquired from each sensor element with the waveform information acquired from a different sensor element in the vicinity of the sensor element in regard to each sampling timing (each sampling time). If the difference in the value of intensity is considerably large as the result of the comparison, the spatial smoothing unit 66 judges that the effect of noise is strong and estimates a more appropriate intensity value at the sampling timing of the sensor element from the waveform information acquired from the different sensor element in the vicinity of the sensor element. A range or area to be regarded as the vicinity of each sensor element is set previously. The estimation can be performed by, for example, by arranging the multiple pieces of waveform information (acquired from the sensor elements at each sampling timing) in space, regarding the arranged pieces of waveform information as a two-dimensional or three-dimensional image, and applying a moving average, median filter, etc. (used for noise removal in image processing) to the two-dimensional or three-dimensional image. Before these processes, adjustment is made so that the phases are equal at the elements. The phase adjustment can be made by, for example, detecting phase shifts by calculating correlation of the waveform information between sensor elements. The judgment on whether the difference in the intensity is considerably large or not is made by setting a threshold value and checking whether the difference from the waveform information acquired from the different sensor element is within a permissible range or not.

Next, the operation of the sixth exemplary embodiment will be described below.

The waveform information acquiring unit 61 acquires the waveform information by the same process as in the above exemplary embodiments.

The spatial smoothing unit 66 compares the waveform information acquired from each sensor element with the waveform information acquired from a different sensor element in the vicinity of the sensor element in regard to each sampling timing (each sampling time). If the difference in the intensity is large, the spatial smoothing unit 66 judges that the effect of noise is strong, estimates a more appropriate intensity value at the sampling timing from the fluctuation of the waveform information acquired from the different sensor element in the vicinity of the sensor element, and corrects the waveform information.

Subsequent processes are equivalent to those in the above exemplary embodiments, and thus detailed explanation thereof is omitted.

By this exemplary embodiment, the effect of noise can be taken into consideration, by which the deterioration in the azimuth resolution and the distance resolution can be reduced.

Seventh Exemplary Embodiment

Figure 7:
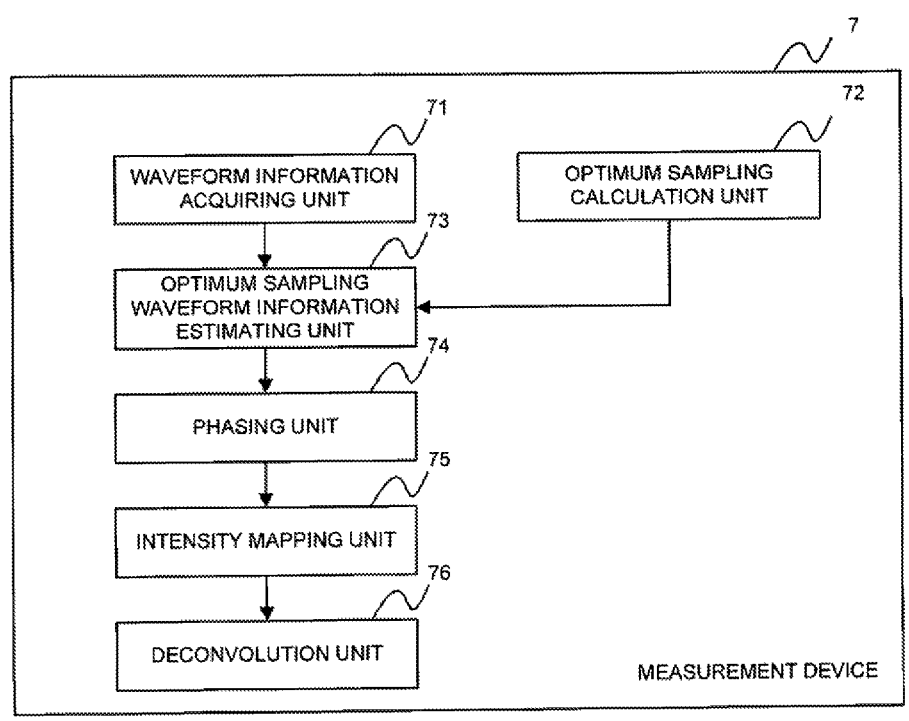
FIG. 7 is a block diagram showing the overall configuration of a seventh exemplary embodiment of the present invention.

Next, a seventh exemplary embodiment in accordance with the present invention will be described in detail with reference to FIG. 7. While this exemplary embodiment will be explained on the basis of the second exemplary embodiment, this exemplary embodiment may also be applied to the first, third, fourth, fifth or sixth exemplary embodiment.

In this exemplary embodiment, a deconvolution unit 76 is placed after the intensity mapping unit in the second exemplary embodiment.

In the seventh exemplary embodiment, a waveform information acquiring unit 71, an optimum sampling calculation unit 72, an optimum sampling waveform information estimating unit 73, a phasing unit 74 and an intensity mapping unit 75 operate in the same way as corresponding components in the second exemplary embodiment of the present invention, and thus detailed explanation thereof is omitted.

The deconvolution unit 76 executes deconvolution to the multidimensional image acquired by the intensity mapping unit 75 by use of directivity distribution in each direction and thereby calculates a high-resolution multidimensional image. The directivity distribution in each direction is measured previously. A lot of methods for executing the deconvolution have been proposed. A method described in Patent Literature 1 (Patent Literature 1: Japanese Patent No. 003518056) may be employed, for example. However, this method is just an example; other methods may also be employed. Incidentally, the deconvolution unit 76 is desired to be equipped with a display monitor for displaying multidimensional images of higher resolution.

The intensity mapping unit 75 acquires the multidimensional image by the same process as in the above exemplary embodiments.

The deconvolution unit 76 executes the deconvolution to the multidimensional image acquired by the intensity mapping unit 75 by use of the directivity distribution in each direction. By the deconvolution, the deconvolution unit 76 calculates a high-resolution multidimensional image.

By this exemplary embodiment, the azimuth resolution and the distance resolution can be increased. This effect is achieved since the waveform information at the sampling timing (sampling time) at the phase adjusted for each direction can be acquired with high precision. Consequently, intensity distribution in each direction becomes more precise and high-precision images can be acquired even when the deconvolution is executed.

Incidentally, while the above measurement devices in accordance with the present invention can be configured by hardware as is clear from the above explanation, the measurement devices can also be implemented by computer programs. In such cases, functions and operations equivalent to those of the above exemplary embodiments are implemented by a processor operating according to a program stored in a program memory. It is also possible to implement part of the functions of the above exemplary embodiments by a computer program.

Further, it is possible to form a measurement system by providing the above-described components (units) in accordance with the present invention in separate devices.

(Appendix 1)

A measurement device comprising:

a plurality of sensors for receiving a wave propagating through space; and sampling timing calculation means for determining difference in arrival time of the wave received by each sensor based on the relative position of each sensor and velocity of the wave and calculating sampling timing for each sensor for acquiring waveform information on the wave based on the arrival time difference.

(Appendix 2)

A measurement device according to appendix 1, further comprising acquisition means for acquiring the waveform information by executing sampling with the calculated sampling timing.

(Appendix 3)

A measurement device according to appendix 1, further comprising acquisition means for acquiring waveform information that is acquirable by executing sampling with the calculated sampling timing, by performing estimation by use of waveform information acquired by executing the sampling with sampling timing approximate to the calculated sampling timing.

(Appendix 4)

A measurement device according to appendix 2 or 3, further comprising measurement means for determining intensity in each direction and/or intensity at each distance by adjusting the acquired waveform information based on the determined arrival time difference.

(Appendix 5)

A measurement device according to any one of appendixes 2-4, further comprising weighting means for weighting each of the acquired pieces of waveform information.

(Appendix 6)

A measurement device according to any one of appendixes 2-5, further comprising modulation means for modulating the wave received by each sensor so that frequency distribution of the waveform information to be acquired is changed.

(Appendix 7)

A measurement device according to any one of appendixes 2-6, further comprising temporal smoothing means for comparing intensity obtained from the waveform information acquired with the sampling timing with intensity before and after the sampling timing and correcting the waveform information based on fluctuation of the intensity depending on the result of the comparison.

(Appendix 8)

A measurement device according to any one of appendixes 2-7, further comprising spatial smoothing means for comparing intensity of the waveform information on the wave received by each sensor with intensity of the waveform information on the wave received by a different sensor in the vicinity of the sensor in regard to each sampling timing and correcting the waveform information based on difference in the intensity depending on the result of the comparison.

(Appendix 9)

A measurement device according to any one of appendixes 2-8, further comprising generation means for generating a multidimensional image using the measured intensity.

(Appendix 10)

A measurement device according to appendix 9, wherein the generation means generates a high-resolution multidimensional image by executing deconvolution to the generated multidimensional image by use of directivity distribution in each direction.

(Appendix 11)

A measurement system comprising:

a plurality of sensors for receiving a wave propagating through space; and sampling timing calculation means for determining difference in the phase of the wave received by each sensor based on the relative position of each sensor and velocity of the wave and calculating sampling timing for each sensor for acquiring waveform information on the wave based on the phase difference.

(Appendix 12)

A measurement system according to appendix 11, further comprising acquisition means for acquiring the waveform information by executing sampling with the calculated sampling timing.

(Appendix 13)

A measurement system according to appendix 11, further comprising acquisition means for acquiring waveform information that is acquirable by executing sampling with the calculated sampling timing, by performing estimation by use of waveform information acquired by executing the sampling with sampling timing approximate to the calculated sampling timing.

(Appendix 14)

A measurement system according to appendix 12 or 13, further comprising measurement means for determining intensity in each direction and/or intensity at each distance by adjusting the acquired waveform information based on the determined arrival time difference.

(Appendix 15)

A measurement system according to any one of appendixes 2-14, further comprising weighting means for weighting each of the acquired pieces of waveform information.

(Appendix 16)

A measurement system according to any one of appendixes 12-15, further comprising modulation means for modulating the wave received by each sensor so that frequency distribution of the waveform information to be acquired is changed.

(Appendix 17)

A measurement system according to any one of appendixes 12-16, further comprising temporal smoothing means for comparing intensity obtained from the waveform information acquired with the sampling timing with intensity before and after the sampling timing and correcting the waveform information based on fluctuation of the intensity depending on the result of the comparison.

(Appendix 18)

A measurement system according to any one of appendixes 12-17, further comprising spatial smoothing means for comparing intensity of the waveform information on the wave received by each sensor with intensity of the waveform information on the wave received by a different sensor in the vicinity of the sensor in regard to each sampling timing and correcting the waveform information based on difference in the intensity depending on the result of the comparison.

(Appendix 19)

A measurement system according to any one of appendixes 12-18, further comprising generation means for generating a multidimensional image using the measured intensity.

(Appendix 20)
A measurement system according to appendix 19, wherein the generation means generates a high-resolution multidimensional image by executing deconvolution to the generated multidimensional image by use of directivity distribution in each direction.

(Appendix 21)
A measurement method comprising:
a reception step of receiving a wave propagating through space with sensors; and
a sampling timing calculation step of determining difference in arrival time of the wave received by each sensor based on the relative position of each sensor and velocity of the wave and calculating sampling timing for each sensor for acquiring waveform information on the wave based on the arrival time difference.

(Appendix 22)
A measurement method according to appendix 21, further comprising an acquisition step of acquiring the waveform information by executing sampling with the calculated sampling timing.

(Appendix 23)
A measurement method according to appendix 21, further comprising an acquisition step of acquiring waveform information that is acquirable by executing sampling with the calculated sampling timing, by performing estimation by use of waveform information acquired by executing the sampling with sampling timing approximate to the calculated sampling timing.

(Appendix 24)
A measurement method according to appendix 21 or 23, further comprising a measurement step of determining intensity in each direction and/or intensity at each distance by adjusting the acquired waveform information based on the determined arrival time difference.

(Appendix 25)
A measurement method according to any one of appendixes 22-24, further comprising a weighting step of weighting each of the acquired pieces of waveform information.

(Appendix 26)
A measurement method according to any one of appendixes 22-25, further comprising a modulation step of modulating the wave received by each sensor so that frequency distribution of the waveform information to be acquired is changed.

(Appendix 27)
A measurement method according to any one of appendixes 22-26, further comprising a temporal smoothing step of comparing intensity obtained from the waveform information acquired with the sampling timing with intensity before and after the sampling timing and correcting the waveform information based on fluctuation of the intensity depending on the result of the comparison.

(Appendix 28)
A measurement method according to any one of appendixes 22-27, further comprising a spatial smoothing step of comparing intensity of the waveform information on the wave received by each sensor with intensity of the waveform information on the wave received by a different sensor in the vicinity of the sensor in regard to each sampling timing and correcting the waveform information based on difference in the intensity depending on the result of the comparison.

(Appendix 29)
A measurement method according to any one of appendixes 22-28, further comprising a generation step of generating a multidimensional image using the measured intensity.

(Appendix 30)
A measurement method according to appendix 29, wherein the generation step generates a high-resolution multidimensional image by executing deconvolution to the generated multidimensional image by use of directivity distribution in each direction.

(Appendix 31)
A program for an information processing device, wherein the program causes the information processing device to execute a sampling timing calculation process of determining difference in arrival time of a wave received by each sensor, provided for receiving the wave propagating through space, based on the relative position of each sensor and velocity of the wave and calculating sampling timing for each sensor for acquiring waveform information on the wave based on the arrival time difference.

While the present invention has been described above with reference to the preferred exemplary embodiments, the present invention is not to be restricted to the particular illustrative exemplary embodiments but can be modified and implemented in various ways within the scope of its technical idea.

This application claims priority to Japanese Patent Application No. 2009-085932 filed on Mar. 31, 2009, the entire disclosure of which is incorporated herein by reference.

REFERENCE SIGNS LIST 1, 2, 3, 4, 5, 6, 7 measurement system
11, 21, 31, 41, 51, 61, 71 waveform information acquiring unit
12, 22, 32, 42, 52, 62, 72 optimum sampling calculation unit
13 sampling control unit
23, 33, 43, 53, 63, 73 optimum sampling waveform information estimating unit
14, 24, 34, 44, 54, 64, 74 phasing unit
15, 25, 35, 45, 55, 65, 75 intensity mapping unit
36 element weighting unit
46 modulation unit
56 temporal smoothing unit
66 spatial smoothing unit
76 deconvolution unit

The invention claimed is:

1. A measurement device comprising:
a plurality of sensors for receiving a wave propagating through space from an object situated at a distance and a direction; and
a sampling timing calculator for determining difference in arrival time of said wave received by each sensor based on the relative position of each sensor and velocity of said wave, and for calculating sampling timing for each sensor for acquiring waveform information on said wave for each direction and each distance depending on previously specified azimuth resolution and distance resolution, based on said arrival time difference.

2. A measurement device according to claim 1, further comprising an acquisition unit for acquiring said waveform information by executing sampling with said calculated sampling timing.

3. A measurement device according to claim 1, further comprising an acquisition unit for acquiring waveform information that is acquirable by executing sampling with said calculated sampling timing, by performing estimation by use of waveform information acquired by executing the sampling with sampling timing approximate to said calculated sampling timing.

4. A measurement device according to claim 2, further comprising a measurement unit for determining intensity in each direction and/or intensity at each distance by adjusting said acquired waveform information based on said determined arrival time difference.

5. A measurement device according to claim 2, further comprising a weighting unit for weighting each of said acquired pieces of waveform information.

6. A measurement device according to claim 2, further comprising a modulator for modulating said wave received by each sensor so that frequency distribution of said waveform information to be acquired is changed.

7. A measurement device according to claim 2, further comprising temporal smoothing means for comparing intensity obtained from said waveform information acquired with said sampling timing with intensity before and after said sampling timing and correcting said waveform information based on fluctuation of said intensity depending on the result of the comparison.

8. A measurement device according to claim 2, further comprising a spatial smoothing unit for comparing intensity of said waveform information on said wave received by each sensor with intensity of said waveform information on said wave received by a different sensor in the vicinity of said sensor in regard to each sampling timing and correcting said waveform information based on difference in said intensity depending on the result of the comparison.

9. A measurement device according to claim 2, further comprising a generator for generating a multidimensional image using said measured intensity.

10. A measurement device according to claim 9, wherein said generator generates a high-resolution multidimensional image by executing deconvolution to said generated multidimensional image by use of directivity distribution in each direction.

11. A measurement system comprising:
a plurality of sensors for receiving a wave propagating through space from an object situated at a distance and a direction; and
a sampling timing calculator for determining difference in the phase of said wave received by each sensor based on the relative position of each sensor and velocity of said wave, and for calculating sampling timing for each sensor for acquiring waveform information on said wave for each direction and each distance depending on previously specified azimuth resolution and distance resolution, based on said phase difference.

12. A measurement method performed by a measurement device, including at least one processor, the method comprising:
receiving, using at least one of said at least one processor, a wave propagating through space from an object situated at a distance and a direction; and
determining, using at least one of said at least one processor, difference in arrival time of said wave received by each sensor based on the relative position of each sensor and velocity of said wave, and calculating, using at least one of said at least one processor, sampling timing for each sensor for acquiring waveform information on said wave for each direction and each distance depending on previously specified azimuth resolution and distance resolution, based on said arrival time difference.

13. A non-transitory computer readable medium having stored there on a computer program which when executed by a computer processor causes the computer to carry out the steps of:
executing a sampling timing calculation process of determining difference in arrival time of a wave received by each sensor, provided for receiving said wave propagating through space from an object situated at a distance and a direction, based on the relative position of each sensor and velocity of said wave, and calculating sampling timing for each sensor for acquiring waveform information on said wave for each direction and each distance depending on previously specified azimuth resolution and distance resolution, based on said arrival time difference.

14. A measurement device according to claim 3, further comprising a measurement unit for determining intensity in each direction and/or intensity at each distance by adjusting said acquired waveform information based on said determined arrival time difference.

15. A measurement device according to claim 3, further comprising a weighting unit for weighting each of said acquired pieces of waveform information.

16. A measurement device according to claim 3 further comprising a modulator for modulating said wave received by each sensor so that frequency distribution of said waveform information to be acquired is changed.

17. A measurement device according to of claim 3, further comprising temporal smoothing means for comparing intensity obtained from said waveform information acquired with said sampling timing with intensity before and after said sampling timing and correcting said waveform information based on fluctuation of said intensity depending on the result of the comparison.

18. A measurement device according to claim 3, further a comprising spatial smoothing unit for comparing intensity of said waveform information on said wave received by each sensor with intensity of said waveform information on said wave received by a different sensor in the vicinity of said sensor in regard to each sampling timing and correcting said waveform information based on difference in said intensity depending on the result of the comparison.

19. A measurement device according to claim 3, further comprising a generator for generating a multidimensional image using said measured intensity.

20. A measurement device according to claim 19, wherein said generator generates a high-resolution multidimensional image by executing deconvolution to said generated multidimensional image by use of directivity distribution in each direction.

* * * * *